P. R. MADISON.
SEED POTATO CUTTER.
APPLICATION FILED JULY 29, 1918.
1,322,709.
Patented Nov. 25, 1919.
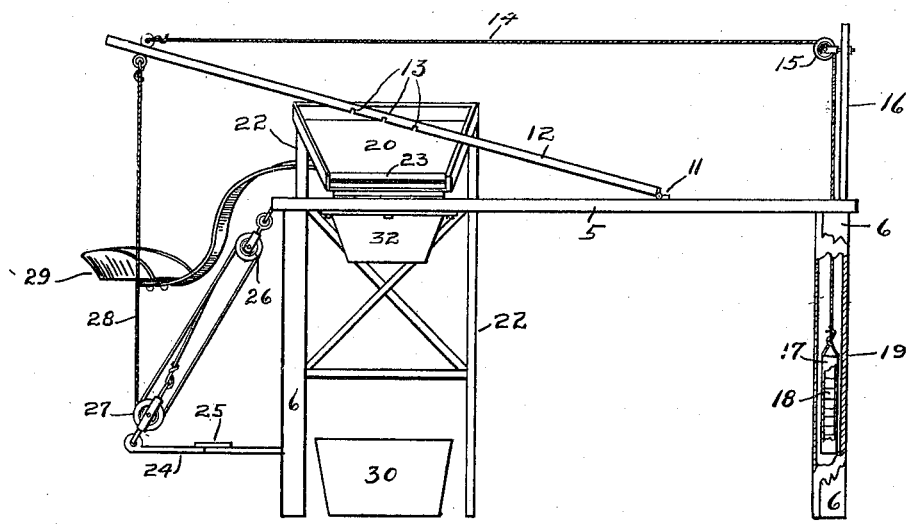
FIG. 1
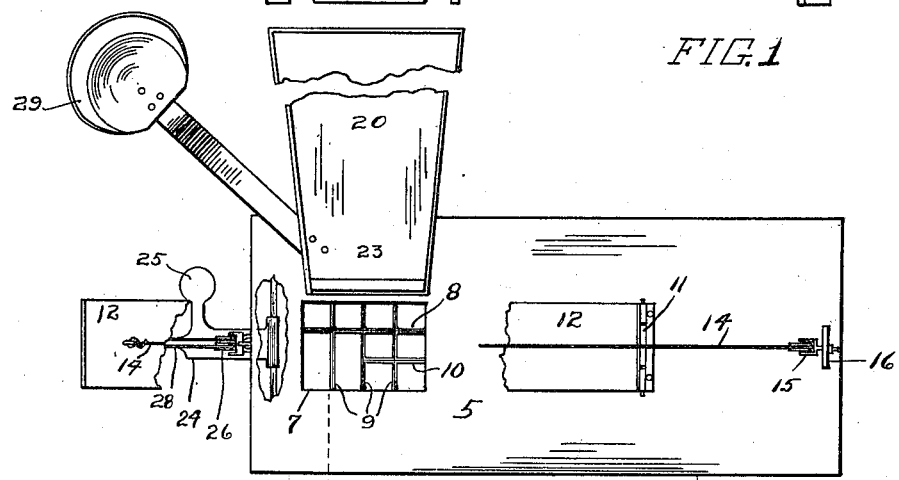
FIG. 2
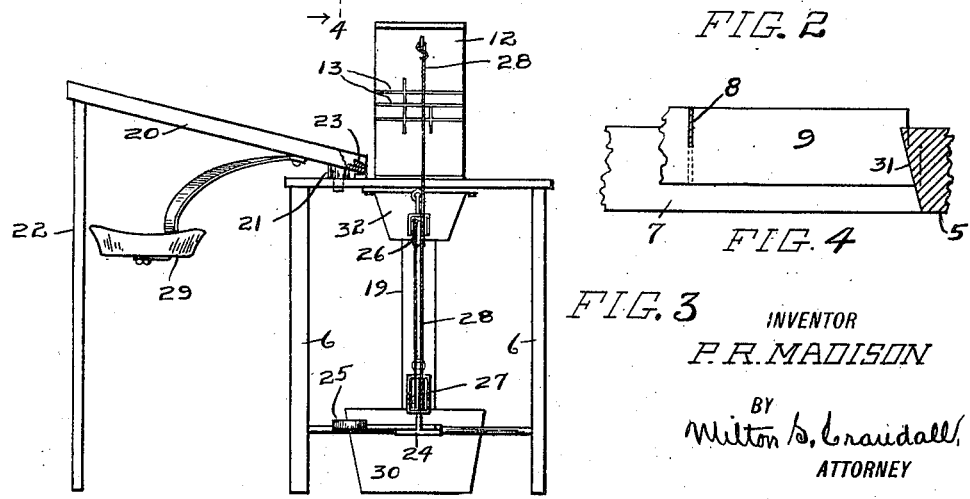
FIG. 3
FIG. 4
INVENTOR
P. R. MADISON
BY
Milton B. Crandall
ATTORNEY

UNITED STATES PATENT OFFICE.

PETER R. MADISON, OF COVINGTON TOWNSHIP, DAKOTA COUNTY, NEBRASKA.

SEED-POTATO CUTTER.

1,322,709. Specification of Letters Patent. Patented Nov. 25, 1919.

Application filed July 29, 1918. Serial No. 247,194.

*To all whom it may concern:*

Be it known that I, PETER R. MADISON, a citizen of the United States, and a resident of Covington township, in the county of Dakota and State of Nebraska, have invented certain new and useful Improvements in Seed-Potato Cutters, of which the following is a specification.

The invention aims primarily to provide an improved vegetable-cutting device particularly adapted for cutting seed potatoes.

A further object of the invention is the production of a seed-potato-cutter embodying certain novel features of construction and arrangements of parts whereby the potatoes are cut with facility and in pieces of substantially uniform size.

Another object is the production of a potato-cutter adapted to cut the potatoes with rapidity and without injury.

Still another object of the invention is the production of a potato-cutter adapted to cut potatoes in any desired number of pieces.

Furthermore, the invention contemplates an improved potato-cutter inexpensive in construction and simple, yet efficient in operation.

With these and other objects in view, the invention, consisting in the construction, combination and novel arrangement of parts, will be fully understood from the following description, reference being had to the accompanying drawings, which form a part of this application and in which like characters of reference indicate corresponding parts throughout the several views, of which,—

Figure 1 is a side elevation of a device constructed in accordance with the invention, a part being cut away;

Fig. 2 is a plan of the same;

Fig. 3 is a front elevation of the same; and

Fig. 4 is a fragmentary enlarged transverse section of the table taken on the line 4 of Fig. 2.

Although I have illustrated and hereinafter described the preferred embodiment of the invention, I would not be understood as being limited to the specific structure chosen for illustration, for various alterations and modifications may be made in the details of construction and arrangement of parts, without departing from the spirit and scope of the invention, as defined in the appended claim.

Referring, now, to the illustrations, the device may consist of a table, including a top, 5, and supporting legs, 6, at the corners thereof.

The front end portion of the top, 5, is provided with a rectangular opening, 7, and extending longitudinally thereacross, is a blade, 8. Three or more transverse blades, 9, extend from side to side of the opening, intersect the blade, 8, and are equally-spaced longitudinally of the opening. 10 is a short longitudinally disposed blade, which intersects the rearmost blade, 9, and extends from the second rear blade, 9, to the edge of the table at the rear of the opening. The blades, 8, and 10 are equally spaced from each other and the respective sides of the opening.

To the top, 5, in the rear of the opening, is hinged as at 11, a board, 12, positioned to oscillate vertically over the opening. The board is provided with kerfs, 13, to receive the edges of the blades, which extend slightly above the surface of the top, 5.

The said board is normally inclined, and held yieldably in such position, as by a flexible element, 14, secured at one end to the board, passed around a direction pulley, 15, carried by a rear upright, 16, on the table; and carrying at its other end a counterweight, preferably including a case, 17, adapted to receive suitable weights, 18. The counterweight may be inclosed in a chute 19.

At one side of the table is an inclined chute or tray, 20, on which are placed the potatoes to be cut. The chute is disposed laterally to the opening, and with its mouth adjacent the side thereof. The tray is preferably pivoted at one end, as at 21, to the table, and its other, or outer end is supported by legs, 22. At the mouth of the tray is a cross strip, 23, which prevents the potatoes from rolling from the tray.

The device is preferably operated by foot power, and for this purpose I provide an arm, 24, suitably pivoted between the front supports, 6, to oscillate vertically, and carrying a foot-pedal, 25. The free ends of the board and arm, 24, are operatively connected, as by multiple-sheave blocks and tackle, one block, 26, being secured to the top, 5, and the other, 27 to the arm, 24, the free end, or fall, of the tackle, 28, being secured to the board, 12. By this means slight depression of the pedal imparts greater movement to the presser-board.

At the front of the tray is an operator's seat, 29, supported by the tray. The seat approximately faces the opening, 7, and the tray may be swung either forwardly or rearwardly to place the operator in a convenient position, with respect to the blades and foot-pedal.

In practice, the operator thrusts a potato upon a blade or blades, then depresses the pedal, whereupon the presser-board coacts with the blade, or blades to sever the potato; and then releases the pedal, which with the presser-board is retracted by the weight. The cut potatoes may be dropped into a receptacle, 30, positioned below the opening, 7.

Small potatoes, to be cut in halves, may be placed upon the longer section of the foremost blade, 9; or if desired to cut into three pieces, they may be placed on the junction of the intermediate blade, 9, and blade, 10. Large potatoes may be quartered by centering them on any of the blade intersections. They may be cut in five pieces by placing them across the two rear blades, 9, and on blade, 10. By placing the potatoes across either two or three of the blade intersections, it is evident they will accordingly be severed in six or eight pieces.

The under edges of the top, 5, adjacent the opening, are preferably chamfered, as at 31, to permit free passage of the potatoes, as it is quite important to their perfect germination that the skin of potatoes should not be marred or injured.

Below the opening, 7, and secured to the top, 5, is a tapered chute, 32, which serves to direct the cut potatoes into the receptacle, 30.

Having thus described my invention, what I claim as new and desire to secure by Letters Patent, is:

A material-treating device comprising a suitable support, pedal-operated material-treating mechanism carried thereby, a tray on the support for the material, and an operator's seat supported by the tray, the tray being mounted to swing on the support to alter the position of the seat with respect to the material-treating mechanism and the pedal.

In testimony whereof, I have hereunto set my hand this 24th day of May, 1918.

PETER R. MADISON.